US006775840B1

(12) United States Patent
Naegel et al.

(10) Patent No.: US 6,775,840 B1
(45) Date of Patent: Aug. 10, 2004

(54) METHOD AND APPARATUS FOR USING A SPECTRUM ANALYZER FOR LOCATING INGRESS NOISE GAPS

(75) Inventors: Charles J. Naegel, Montara, CA (US); Mark E. Millet, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 08/993,334

(22) Filed: Dec. 19, 1997

(51) Int. Cl.[7] .......................... H04N 7/173; H04B 17/00
(52) U.S. Cl. .......................... 725/111; 725/124; 455/62
(58) Field of Search ................................. 725/107, 111, 725/124, 125; 455/67.3, 67.4, 62, 63, 67.1; 702/76–78; 324/76.11–76.77; H04N 7/173; H04B 17/00, 1/10, 15/00; G06F 19/00; G01R 23/10

(56) References Cited

U.S. PATENT DOCUMENTS

| | | | |
|---|---|---|---|
| 3,750,022 A | | 7/1973 | Curry et al. |
| 4,145,656 A | | 3/1979 | Merryman et al. |
| 4,665,494 A | * | 5/1987 | Tanaka et al. .................. 702/77 |
| 5,048,054 A | | 9/1991 | Eyuboglu et al. |
| 5,225,902 A | | 7/1993 | McMullan, Jr. |

(List continued on next page.)

OTHER PUBLICATIONS

Wavetek®, "RP100 Return Path Monitoring System," *Product Brochure*, (1997).
Ulm, et al., "Data–Over–Cable Service Interface Specification", *Radio Frequency Interface Specification, No. 102–971008*, (1997).
ANSI®, Carrier–to–Customer Installation–DS1 Metallic Interface, *American National Standard for Telecommunications*, T1.403 (1989).

Rogers Engineering, Two–Way CATV Plant Characterization Test Procedures, *Test Procedures for Two–Way CATV Plant Characterization*, p. 8 (1993).
R.P.C. Wolters, "Characteristics of Upstream Channel Noise in CATV–Networks", *IEEE Transactions of Broadcasting*, vol. 42, No. 4, pp. 328–332 (1996).
Naegeli et al., "Method and Apparatus for Locating a Cleaner Bandwidth in a Frequency Channel for Data Transmission", Cisco Technology, U.S. Application No. 09/227, 991, filed Jan. 8, 1999, pp. 1–46.
Wei–Sing Chen, "Method And Apparatus For Selecting Optimum Frequency For Upstream Data Transmission In A Network System Utilizing Cable Modems" U.S. patent application No. 09/286,202, filed Apr. 5, 1999, 47 pages.

*Primary Examiner*—Andrew Faile
*Assistant Examiner*—Andrew Y Koenig
(74) *Attorney, Agent, or Firm*—Beyer Weaver & Thomas

(57) ABSTRACT

A device, system and method are disclosed for locating clean channels for upstream data carriers that are certain to have lower noise levels than the currently utilized channel used for carrying data upstream, thereby enabling intelligent placement of an upstream data carrier in a cable television system utilizing cable modems for two-way data transmission. A spectrum analyzer is placed in a cable modem termination system located in a headend of a cable television system. The spectrum analyzer contains a programmable device comprised of programmable circuitry. The circuitry is operable in a first mode to receive a signal having an associated frequency spectrum made up of several channels. The circuitry also determines a noise level for each of the channels. The circuitry is also operable in a second mode to receive the signal described above and filter the signal to generate several filtered signals where each filtered signal corresponds to one of the channels. The circuitry is also operable in the second mode to monitor another noise level associated with each of the filtered signals. The channels associated with the filtered signals are selected based on the noise levels determined in the first mode.

46 Claims, 9 Drawing Sheets

U.S. PATENT DOCUMENTS

| | | |
|---|---|---|
| 5,297,186 A | 3/1994 | Dong |
| 5,488,412 A | 1/1996 | Majeti et al. |
| 5,586,121 A | 12/1996 | Moura et al. |
| 5,631,846 A | 5/1997 | Szurkowski |
| 5,729,824 A | 3/1998 | O'Neil et al. |
| RE35,774 E | 4/1998 | Moura et al. |
| 5,764,699 A | 6/1998 | Needham et al. |
| 5,790,523 A | 8/1998 | Ritchie et al. |
| 5,802,446 A | 9/1998 | Giorgi et al. |
| 5,818,845 A | 10/1998 | Moura et al. |
| 5,828,655 A | 10/1998 | Moura et al. |
| 5,857,147 A | 1/1999 | Gardner et al. |
| 5,859,852 A | 1/1999 | Moura et al. |
| 5,862,451 A | 1/1999 | Grau et al. |
| 5,867,528 A | 2/1999 | Verbucken |
| 5,939,887 A * | 8/1999 | Schmidt et al. .............. 324/628 |
| 5,943,604 A | 8/1999 | Chen et al. |
| 5,946,048 A | 8/1999 | Levan |
| 5,956,047 A | 9/1999 | Levan |
| 5,956,346 A | 9/1999 | Levan |
| 5,959,660 A | 9/1999 | Levan |
| 5,959,997 A | 9/1999 | Moura et al. |
| 6,032,019 A * | 2/2000 | Chen et al. .................. 725/124 |
| 6,041,340 A * | 3/2000 | Mintzer ....................... 708/403 |
| 6,094,211 A * | 7/2000 | Baran et al. ................. 725/125 |
| 6,281,829 B1 | 8/2001 | Amrany et al. |
| 6,321,384 B1 | 11/2001 | Eldering |
| 6,370,153 B1 | 4/2002 | Eng |
| 6,385,773 B1 | 5/2002 | Schwartzman et al. |
| 6,389,068 B1 | 5/2002 | Smith et al. |

* cited by examiner

METHOD AND APPARATUS FOR USING A SPECTRUM ANALYZER FOR LOCATING INGRESS NOISE GAPS

BACKGROUND OF THE INVENTION

1. Field of Invention

The present invention relates generally to methods and apparatus for transmitting digital data in cable television network systems. More specifically, the present invention relates to methods and apparatus for locating upstream data channels with the least amount of ingress noise or other interference.

2. Discussion of Related Art

The cable TV industry has been upgrading its signal distribution and transmission infrastructure since the late 1980s. In many cable television markets, the infrastructure and topology of cable TV systems now include fiber optics as part of its signal transmission component. This has accelerated the pace at which the cable industry has taken advantage of the inherent two-way communication capability of cable systems. The cable industry is now poised to develop reliable and efficient two-way transmission of digital data over its cable lines at speeds orders of magnitude faster than those available through telephone lines, thereby allowing its subscribers to access digital data for uses ranging from Internet access to cablecommuting.

Originally, cable TV lines were exclusively coaxial cable. The system included a cable headend, i.e. a distribution hub, which received analog signals for broadcast from various sources such as satellites, broadcast transmissions, or local TV studios. Coaxial cable from the headend was connected to multiple distribution nodes, each of which could supply many houses or subscribers. From the distribution nodes, trunk lines (linear sections of coaxial cable) extended toward remote sites on the cable network. A typical trunk line is about 10 kilometers long. Branching off of these trunk lines were distribution or feeder cables (40% of the system's cable footage) to specific neighborhoods, and drop cables (45% of the system's cable footage) to homes receiving cable television. Amplifiers are provided to maintain signal strength at various locations along the trunk line. For example, broadband amplifiers are required about every 2000 feet depending on the bandwidth of the system. The maximum number of amplifiers that can be placed in a run or cascade is limited by the build-up of noise and distortion. This configuration, known as tree and branch, is still present in older segments of the cable TV market.

With cable television, a TV analog signal received at the headend of a particular cable system is broadcast to all subscribers on that cable system. The subscriber simply needed a television with an appropriate cable receptor to receive the cable television signal. The cable TV signal was broadcast at a radio frequency range of about 50 to 800 MHz. Broadcast signals were sent downstream; that is, from the headend of the cable system across the distribution nodes, over the trunk line, to feeder lines that led to the subscribers. However, the cable system did not have installed the equipment necessary for sending signals from subscribers to the headend, known as return or upstream signal transmission. Not surprisingly, nor were there provisions for digital signal transmission either downstream or upstream.

In the 1980s, cable companies began installing optical fibers between the headend of the cable system and distribution nodes (discussed in greater detail with respect to FIG. 1 below). The optical fibers reduced noise, improved speed and bandwidth, and reduced the need for amplification of signals along the cable lines. In many locations, cable companies installed optical fibers for both downstream and upstream signals. The resulting systems are known as hybrid fiber-coaxial (HFC) systems. Upstream signal transmission was made possible through the use of duplex or two-way filters. These filters allow signals of certain frequencies to go in one direction and of other frequencies to go in the opposite direction. This new upstream data transmission capability allowed cable companies to use set-top cable boxes and allowed subscribers pay-per-view functionality, i.e. a service allowing subscribers to send a signal to the cable system indicating that they want to see a certain program.

In addition, cable companies began installing fiber optic lines into the trunk lines of the cable system in the late 1980s. A typical fiber optic trunk line can be up to 80 kilometers long, whereas a typical coaxial trunk line is about 10 kilometers long, as mentioned above. Prior to the 1990s, cable television systems were not intended to be general-purpose communications mechanisms. Their primary purpose was transmitting a variety of television signals to subscribers. Thus, they needed to be one-way transmission paths from a central location, known as the headend, to each subscriber's home, delivering essentially the same signals to each subscriber. HFC systems run fiber deep into the cable TV network offering subscribers more neighborhood specific programming by segmenting an existing system into individual serving areas between 100 to 2,000 subscribers. Although networks exclusively using fiber optics would be optimal, presently cable networks equipped with HFC configurations are capable of delivering a variety of high bandwidth, interactive services to homes for significantly lower costs than networks using only fiber optic cables.

FIG. 1 is a block diagram of a two-way HFC cable system utilizing a cable modem for data transmission. It shows a headend 102 (essentially a distribution hub) which can typically service about 40,000 subscribers. Headend 102 contains a cable modem termination system (CMTS) 104 that is needed when transmitting and receiving data using cable modems. CMTS 104 is discussed in greater detail with respect to FIG. 2. Headend 102 is connected through pairs of fiber optic lines 106 (one line for each direction) to a series of fiber nodes 108.

Each headend can support normally up to 80 fiber nodes. Pre-HFC cable systems used coaxial cables and conventional distribution nodes. Since a single coaxial cable was capable of transmitting data in both directions, one coaxial cable ran between the headend and each distribution node. In addition, because cable modems were not used, the headend of pre-HFC cable systems did not contain a CMTS. Each of the fiber nodes 108 is connected by a coaxial cable 110 to duplex filters 112 which permit certain frequencies to go in one direction and other frequencies to go in the opposite direction (frequency ranges for upstream and downstream paths are discussed below). Each fiber node 108 can normally service up to 500 subscribers, depending on the bandwidth. Fiber node 108, coaxial cable 110, two-way amplifiers 112, plus distribution amplifiers 114 along trunk line 116, and subscriber taps, i.e. branch lines 118, make up the coaxial distribution system of an HFC system. Subscriber tap 118 is connected to a cable modem 120. Cable modem 120 is, in turn, connected to a subscriber computer 122.

Recently, it has been contemplated that HFC cable systems could be used for two-way transmission of digital data.

The data may be Internet data, digital audio data, or digital video data, in MPEG format, for example, from one or more external sources 100. Using two-way HFC cable systems for transmitting digital data is attractive for a number of reasons. Most notably, they provide up to a thousand times faster transmission of digital data than is presently possible over telephone lines. However, in order for a two-way cable system to provide digital communications, subscribers must be equipped with cable modems, such as cable modem 120. With respect to Internet data, the public telephone network has been used, for the most part, to access the Internet from remote locations. Through telephone lines, data is typically transmitted at speeds ranging from 2,400 to 56,600 bits per second (bps) using commercial (and widely used) data modems for personal computers. Using a two-way HFC system as shown in FIG. 1 with cable modems, data may be transferred at speeds of 10 million bps, or more. Table 1 is a comparison of transmission times for transmitting a 500 kilobyte image over the Internet.

TABLE 1

Time to Transmit a Single 500 Kbytes Image

| | |
|---|---|
| Telephone Modem (28.8 kbps) | 6–8 minutes |
| ISDN Line (64 kbps) | 1–1.5 minutes |
| Cable Modem (10 Mbps) | 1 second or less |

Furthermore, subscribers can be fully connected twenty-four hours a day to services without interfering with cable television service or phone service. The cable modem, an improvement of a conventional PC data modem, provides this high speed connectivity and is, therefore, instrumental in transforming the cable system into a full service provider of video, voice and data telecommunications services.

As mentioned above, the cable industry has been upgrading its coaxial cable systems to HFC systems that utilize fiber optics to connect headends to fiber nodes and, in some instances, to also use them in the trunk lines of the coaxial distribution system. In way of background, optical fiber is constructed from thin strands of glass that carry signals longer distances and have a wider bandwidth than either coaxial cable or the twisted pair copper wire used by telephone companies. Fiber optic lines allow signals to be carried much greater distances without the use of amplifiers (item 114 of FIG. 1). Amplifiers degrade the signal quality and are susceptible to high maintenance costs. Thus, coaxial distribution systems that use fiber optics have much less need for amplifiers. In addition, amplifiers are typically not needed for fiber optic lines (item 106 of FIG. 1) connecting the headend to the fiber nodes.

In cable systems, digital data is carried over radio frequency (RF) carrier signals. Cable modems are devices that convert digital data to a modulated RF signal and converts the RF signal back to digital form. The conversion is done at two points: at the subscriber's home by a cable modem and at a CMTS located at the headend. The CMTS converts the digital data to a modulated RF signal which is carried over the fiber and coaxial lines to the subscriber premises. The cable modem then demodulates the RF signal and feeds the digital data to a computer. On the return path, the operations are reversed. The digital data is fed to the cable modem which converts it to a modulated RF signal (it is helpful to keep in mind that the word "modem" is derived from modulator/demodulator). Once the CMTS receives the RF signal, it demodulates it and transmits the digital data to an external source.

As mentioned above, cable modem technology is in a unique position to meet the demands of users seeking fast access to information services, the Internet and business applications, and can be used by those interested in cable-commuting (a group of workers working from home or remote sites whose numbers will grow as the cable modem infrastructure becomes increasingly prevalent). Not surprisingly, with the growing interest in receiving data over cable network systems, there has been increased focus on performance, reliability, and improved maintenance of such systems. In sum, cable companies are in the midst of a transition from their traditional core business of entertainment video programming to a position as full service providers of video, voice and data telecommunication services. Among the elements that have made this transition possible are technologies such as the cable modem.

A problem common to all upstream data transmission on cable systems, i.e. transmissions from the cable modem in the home back to the headend, is ingress noise which lowers the signal-to-noise ratio, also referred to as carrier-to-noise ratio of an upstream channel. Ingress noise can result from numerous internal and external sources. Sources of noise internal to the cable system may include cable television network equipment, subscriber terminals (televisions, VCRs, cable modems, etc.), intermodular signals resulting from corroded cable termini, and core connections. Significant sources of noise external to the cable system include home appliances, welding machines, automobile ignition systems, and radio broadcasts, e.g. citizen band and ham radio transmissions. All of these ingress noise sources enter the cable system over the coaxial cable line, which acts essentially as a long antenna. Ultimately, when cable systems are entirely optical fiber, ingress noise will be a far less significant problem. However, until that time, ingress noise is and will continue to be a problem with upstream transmissions.

The portion of bandwidth reserved for upstream signals is normally in the 5 to 42 MHz range. Some of this frequency band may be allocated for set-top boxes, pay-per-view, and other services provided over the cable system. Thus, a cable modem may only be entitled to some fraction or "sub-band" such as between 200 Khz to 3.2 MHz. This sub-band is referred to as its "alloted band slice" of the entire upstream frequency range (5 to 42 MHz). This portion of the spectrum—from 5 to 42 MHz—is particularly subject to ingress noise and other types of interference. Thus, cable systems offering two-way data services must be designed to operate given these conditions.

As noted above, ingress noise, typically narrow band, e.g., below 100 KHz, is a general noise pattern found in cable systems. Upstream channel noise resulting from ingress noise adversely impacts upstream data transmission by reducing data throughput and interrupting service, thereby adversely affecting performance and efficient maintenance. One strategy to deal with cable modem ingress noise is to position the modem's upstream data carrier in an ingress noise gap where ingress noise is determined to be low, such as between radio transmission bands. The goal is to position data carriers to avoid already allocated areas.

Ingress noise varies with time, but tends to accumulate over the system and is measured at the headend (ingress noise is uniform over the entire wire). In addition, while a particular frequency band may have been appropriate for upstream transmissions at the beginning of a transmission, it may later be unacceptably noisy for carrying a signal. Therefore, a cable system must attempt to identify noisy frequency bands and locate optimal or better bands for upstream transmission of data at a given time.

Block 104 of FIG. 1 represents a cable modem termination system connected to a fiber node 108 by pairs of optical fibers 106. The primary functions of the CMTS are (1) receiving signals from external sources 100 and converting the format of those signals, e.g., microwave signals to electrical signals suitable for transmission over the cable system; (2) providing appropriate media access control level packet headers for data received by the cable system, (3) modulating and demodulating the data to and from the cable system, and (4) converting the electrical signal in the CMTS to an optical signal for transmission over the optical lines to the fiber nodes.

FIG. 2 is a block diagram showing the basic components of a cable modem termination system (item 104 of FIG. 1). Data Network Interface 202 is an interface component between external data sources and the cable system. External data sources (item 100 of FIG. 1) transmit data to data network interface 202 via optical fiber, microwave link, satellite link, or through various other media. A Media Access Control Block (MAC Block) 204 receives data packets from Data Network Interface 202. Its primary purpose is to encapsulate the data packets with a MAC headers containing cable modem addresses according to the MCNS standard. A MAC address is necessary to distinguish data from the cable modems since all the modems share a common upstream path, and so that the system knows where to send data. Thus, data packets, regardless of format, must be mapped to a particular MAC address.

MAC block 204 transmits data via a one-way communication medium to a downstream modulator and transmitter 206. Downstream modulator and transmitter 206 takes the data in a packet structure and modulates it on the down stream carrier using, for example, QAM 64 modulation (other methods of modulation can be used such as CDMA {Code Division Multiple Access} OFDM {Orthognal Frequency Divison Multiplexing}, FSK {FREQ Shift Keying}). The return data is likewise modulated using, for example, QAM 16 or QSPK. These modulations methods are well-known in the art.

QAM requires a relatively high signal-to-noise ratio to work such as 20 db. QPSK, on the other hand, used for demodulating the upstream data, does not require as high a value, and can work at around 15 db. QPSK is also less expensive and requires less processing than QAM. However, the downstream data path is considered less hostile to the signal and sends data at a very high rate thus requiring QAM. The data carried upstream is assumed to require a more rubust format such as QPSK.

It should be noted that optical fibers transmit data in one direction per wavelength and coaxial cables can transmit data in two directions. Thus, there generally is only one coaxial cable leaving the fiber node which is used to send and receive data, whereas there are two optical fiber lines or wave guide from the fiber node to the downstream and upstream modulators.

Downstream Modulator and Transmitter 206 converts the digital data packets to modulated downstream RF frames, such as MPEG or ATM frames, using quadrature amplitude modulation, e.g. 64 QAM, forward error correcting (FEC) code, and packet interleaving. Data from other services, such as television, is added at a combiner 207. Converter 208 converts the modulated RF electrical signals to optical signals that can be received and transmitted by a Fiber Node 210. Each Fiber Node 210 can generally service about 500 subscribers depending on bandwidth. Converter 212 converts optical signals transmitted by Fiber Node 210 to electrical signals that can be processed by an Upstream Demodulator and Receiver 214. This component demodulates the upstream RF signal (in the 5–42 Mhz range) using, for example, 16 QAM or QPSK. It then sends the digital data to MAC 204.

One method of locating better channels for the upstream data carrier is manually monitoring a particular channel and gathering historical data with respect to the noise level on that channel over a certain period of time. The historical data is then used to compile statistics regarding noise level change on that channel. This requires that an engineer or other human operator monitor and gather the data manually to compile the statistics regarding noise on the channel. This method presumes that the noise level on a channel is "regular" and can be predicted if sufficient statistics are compiled. Even after this process is automated to some degree in terms of monitoring and data gathering, it assumes that the noise on a channel has a pattern that can be detected. This a faulty and unjustifiable assumption. In reality, the noise level on all channels are random and chaotic. Specifically, if multiple periodic, yet independent, functions drive a single system, its measured output has a chaotic output function. Furthermore, even if it were possible to extract some degree of regularity in noise patterns, this process is cumbersome, expensive, and requires a high degree of human intervention.

Another method, closely related, involves using a device for gathering data and processing statistics one frequency at a time. The device essentially accumulates data, hashes it, and derives statistics using probability functions. Once it finds a low-noise channel, the system changes its upstream carrier to that channel. However, the time between determining a potentially lower noise channel and using that channel is in the range of minutes to hours. Consequently, the data is likely outdated by the time the system uses it for locating an upstream data carrier.

Both of these methods assume that the cable system is relatively static. However, it is evident that noise in the cable system is far more chaotic in nature than static. There are hundreds of sources of noise that can interfere with the carrier-to-noise ratio of the upstream data. For example, time, weather, temperature, electrical conductivity in the atmosphere, people's habits, and other disparate factors can contribute to ingress noise on an upstream data carrier.

Therefore, what is needed is a reliable and efficient method of locating channels for upstream data carriers that are certain to have lower noise levels than the current channel for upstream data, thereby enabling deliberate and intelligent selection of an upstream data carrier in an inherently chaotic network system utilizing cable modems.

SUMMARY OF THE INVENTION

To achieve the foregoing and in accordance with the purpose of the present invention, methods of and apparatus for locating clean channels for upstream data carriers in a cable television system utilizing cable modems are described. The present invention addresses data integrity by monitoring a channel or a group of channels for selecting a clean upstream data carrier. This is done by placing a digital power receiver on a channel to determine whether that channel has less ingress noise than the channel currently being used. If it is determined that there is less ingress noise, the system can switch to the cleaner channel with minimal latency. The power receiver contains a field programmable gate array (FPGA) that can be configured to perform a fast Fourier transformation (FFT) or a finite response filter (FIR). When performing in FFT mode, the FPGA provides a selection of N number of channels that are possible candidates for the upstream data carrier. When in FIR mode, the FPGA acts as an N-channel receiver to monitor N number of channels and to select one channel from the N channels as the upstream data carrier.

In a preferred embodiment, a spectrum analyzer is placed in a cable modem termination system located in a headend of a cable television system. The spectrum analyzer contains a programmable device which is operable in a first mode to receive a signal having an associated frequency spectrum made up of several channels, and determines a noise level for each of the channels. The circuitry is operable in a second mode to receive the signal described above and filter the signal to generate several filtered signals where each filtered signal corresponds to one of the channels. The circuitry is also operable in the second mode to monitor another noise level associated with each of the filtered signals. The channels associated with the filtered signals are selected based on the noise levels determined in the first mode.

In another preferred embodiment, the programmable device contains control circuitry for instructing programmable circuitry to operate either in a first mode in which the device performs a fast Fourier transformation or in a second mode in which the device performs as a finite impulse response filter. In yet another preferred embodiment, the channels selected correspond to filtered signals with noise levels that fall below a pre-established threshold noise level. In yet another preferred embodiment, the channels selected correspond to filtered signals with the lowest noise levels. According to another embodiment, a method of locating a low-noise channel for data transmission from a subscriber to a headend in a cable television system is described. In this method, a spectrum analyzer receives a signal having an associated frequency spectrum comprising several channels. A different signal is generated representative of a noise spectrum associated with the first signal where the noise spectrum is made up of several noise levels such that a noise level corresponds to each of the several channels. A subset of the channels is selected according to the noise levels of the channels. The spectrum analyzer then band pass filters the first signal in the subset of selected channels thereby generating several filtered signals. A second set of noise levels, where each noise level corresponds to one of the filtered signals, is monitored and a channel from the subset of channels is selected according to a second noise level. This selected channel is used for data transmission.

In yet another aspect of the invention, a computer readable medium storing programmed instructions arranged to locate a low-noise channel for transmitting data from a subscriber to a headend is described.

In yet another aspect of the invention, a cable television system capable of two-way transmission of data is described. The cable television system includes a downstream data path originating from a headend to subscribers and an upstream data path from the subscribers to the headend. Also described are a downstream modulator and transmitter for transmitting a modulated downstream signal, and an upstream demodulator and receiver for receiving and demodulating the upstream signal. Both are located in a cable modem termination system in the headend. Also included in the cable television system is a spectrum analyzer for receiving and monitoring the upstream signal carried on the upstream data path. The spectrum analyzer comprises signal processing circuitry for generating another upstream signal representative of a noise spectrum associated with the first upstream signal. The noise spectrum is made up of several upstream noise levels, such that a first upstream noise level is associated with each of the several channels. The signal processing circuitry also determines a second upstream noise level for each selected channel from the group of channels. The system selects a channel based on the upstream noise levels. The spectrum analyzer also contains circuitry for controlling operation of the signal processing circuitry.

A further understanding of the nature and advantage of the present invention may be realized by reference to the remaining portions of the specification and drawings.

BRIEF DESCRIPTION OF THE DRAWINGS

The invention, together with further advantages thereof, may best be understood by reference of the following description taken in conjunction with the accompanying drawings in which.

DETAILED DESCRIPTION OF THE PREFERRED EMBODIMENTS

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

Important issues regarding the expansion of the existing cable system infrastructure to include full service two-way communication of digital data are reliability, low maintenance, and data integrity. The service must have low maintenance costs and must not alter data unintentionally during transmission. High data integrity is extremely important to most users. One way data is affected during transmission is by ingress noise, particularly on the upstream data path. As discussed above, present methods for detecting high noise levels and locating an acceptable noise level are too slow or too costly.

The present invention addresses the issue of data integrity by monitoring a channel or a group of channels. It does this by placing a digital power receiver (essentially a data collector or accumulator) on the channel or group of channels thereby determining, during operation and before switching channels of the upstream carrier, whether a particular channel has less ingress noise than the current channel. If the current frequency is unacceptably noisy, the system can determine a priori whether the channel being monitored is an improvement over the current channel. This can be done essentially in real time, that is, with a latency of the time it takes to receive a packet and jump to a new frequency. For example, if all the channels available are too noisy, the system can keep the current best channel by not changing channels since none of the available channels would be an improvement over the current channel. Thus, with the present invention the system can listen to channels in real time and make an intelligent decision regarding which frequencies to use as an upstream data carrier.

Figure 3:
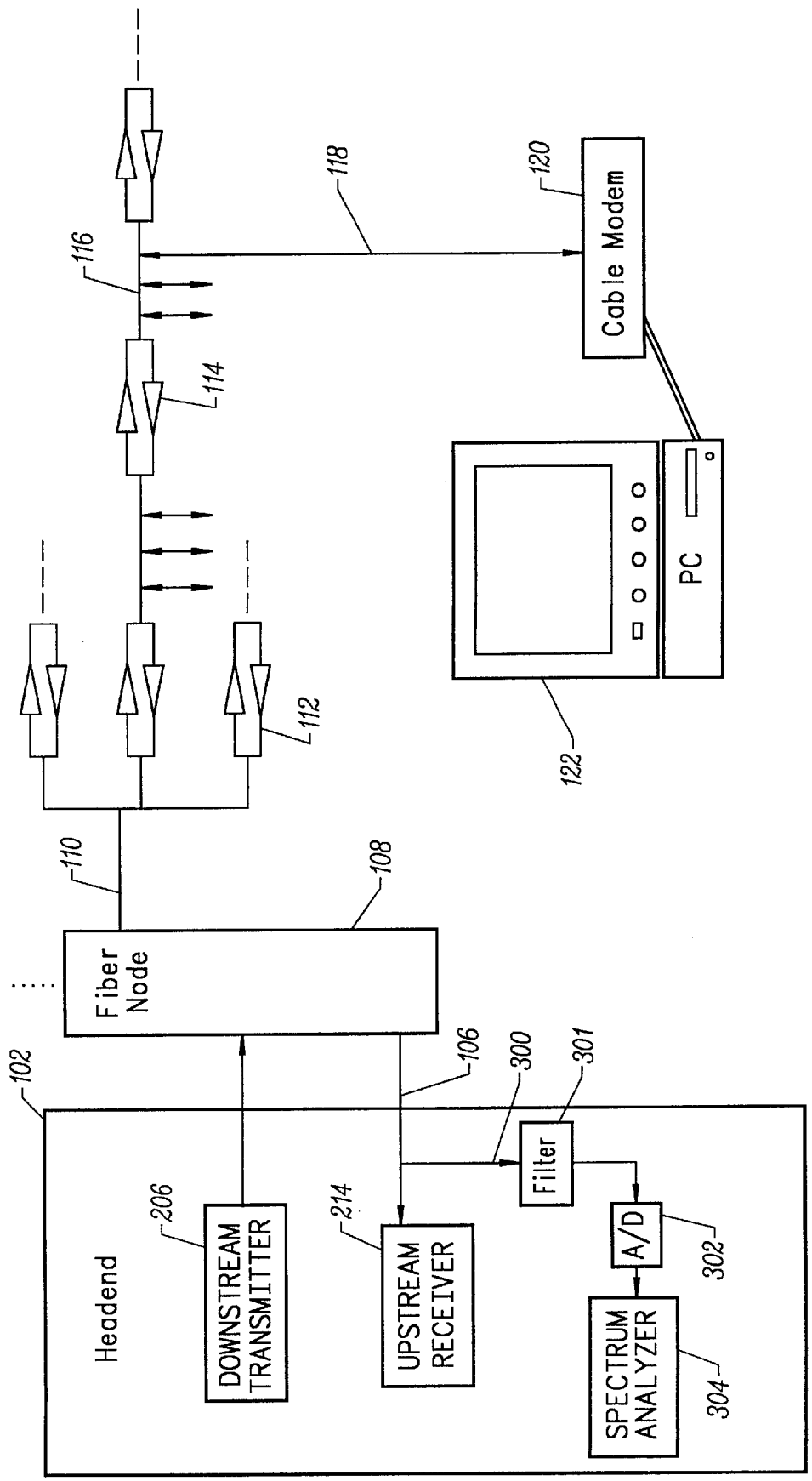
FIG. 3 is a block diagram of a cable plant showing the placement of a spectrum analyzer in a preferred embodiment.

FIG. 3 is a block diagram of a cable plant showing the placement of a spectrum analyzer (also referred to as a spectrum manager) in a preferred embodiment. A data carrier 300 is shown tapping cable line 106 which leads directly to the upstream receiver 214. The analog data is passed through an anti-alias filter 301, which essentially acts as a low-pass filter. Filter 301 cuts off or filters frequencies higher than 42 MHz, or some other predetermined upper frequency limit. An analog/digital converter 302 digitizes the radio frequency signals and feeds the digitized upstream data to a spectrum analyzer 304 located within the CMTS (not shown) in a preferred embodiment. The digital upstream data is not diverted from reaching the upstream receiver (it is essential that receiver 214 always be fed the upstream data for two-way data transmission to function), rather, the data is received by both units. The energy of each data stream (one to the upstream receiver and one to the spectrum manager) is half of the total energy of the incoming upstream data. In another preferred embodiment, the spectrum analyzer 304 can be located on the upstream data path outside the headend. Regardless of where spectrum analyzer 304 is located, it accumulates data for further analysis by a central processing unit (CPU).

Figure 4:
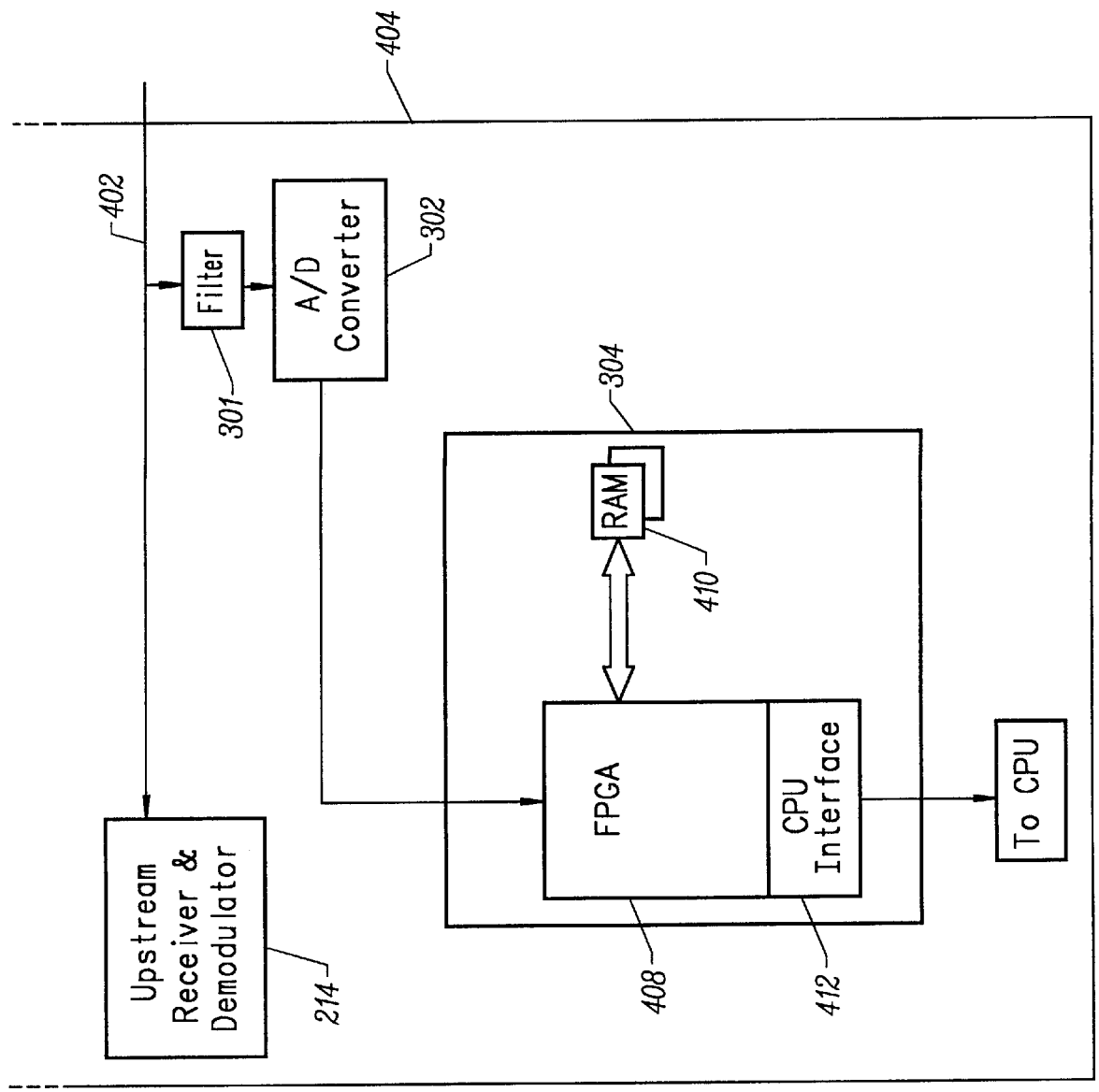
FIG. 4 shows in greater detail the location of spectrum analyzer and the internal components of the spectrum manager.

FIG. 4 shows in greater detail the location of spectrum analyzer 304 and the internal components of the spectrum manager itself. Radio frequency signals 402 enter the CMTS 404 and are fed to spectrum manager 304 and to the upstream receiver 214. The first component in spectrum analyzer 304 to receive the data is a field programmable gate array (FPGA) 408 where the data is processed and all the mathematical functions are calculated in one of three modes of operation as discussed below. FPGA 408 is described in greater detail with reference to FIGS. 5a and 5b. Coupled to FPGA 408 are random access memory units 410 used to store data necessary for performing the mathematical functions performed by FPGA 408. Once the data is processed by the FPGA 408, the data can be accessed by a CPU (not shown) through a CPU interface 412, part of FPGA 408. CPU interface 412 is a hardware component that enables the CPU to read data from the FPGA. The CPU determines whether the channel for the upstream data carrier should be switched based on the data provided by the FPGA.

Figure 5A:
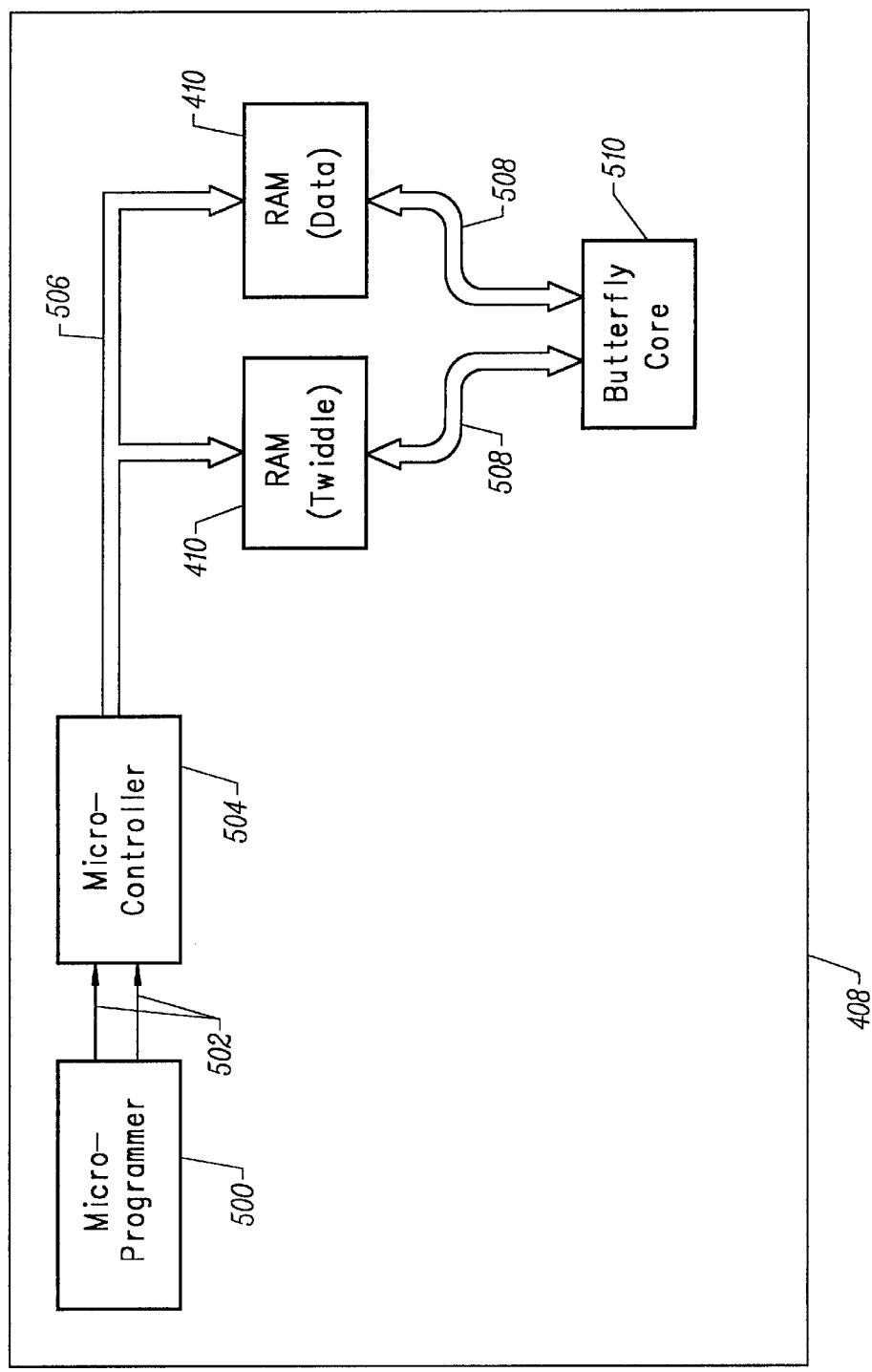
FIG. 5a is a block diagram showing components of an FPGA configured to operate as an FFT generator in a preferred embodiment.

FIG. 5a is a block diagram showing components of an FPGA configured to operate as an FFT generator in a preferred embodiment. With an FFT generator, the system receives energy over a longer term for all frequencies. As is well known to one of ordinary skill in the art, an FPGA can be configured or programmed to perform various mathematical functions. A Fast Fourier Transform is one such function. An FFT is a series of additions and multiplications. It is well known as a method of reducing the total number of computations of required in a discrete Fourier transform.

A microprogrammer 500 has control over the sequence of the mathematical operations. It essentially causes the application instructions to occur in the right order. It is programmed to perform in FFT mode by the CPU. Control lines 502 carry instructions from microprogrammer 500 to a microcontroller 504. Microcontroller 504 accepts commands and other instructions from microprogrammer 500. Microcontroller 504 then determines addresses of where to read and write data in RAM 410 banks. For example, with an FFT calculation, the data would primarily be the intermediate results of all the required multiplications and additions.

The addresses are communicated over an address bus 506 to memory banks 410. One of the RAM banks is for holding twiddle factors used in the FFT calculations. RAM 410 is a memory bank for holding data for the FFT. Buses 508 move data between memory bank 410 and a core 514, often referred to as a butterfly core, which performs all the necessary calculations. The result of the FFT represents a series of energy levels characterized by amplitudes corresponding to particular frequencies. This series of energy levels corresponds to N channels which are subsequently monitored continuously by a Finite Impulse Response (FIR) filter (discussed below). The CPU processes the stored data by first accessing the data through an FPGA data port. After the FFT calculation, FPGA 408 is re-programmed to perform as an FIR filter. This is discussed in greater detail with regard to FIG. 5b. In a specific embodiment, ten-bit data is received by the FPGA at 100 million samples per second. The data is latched and loaded into memory two samples at a time, thereby allowing for low-cost memory. The stored data is then processed by the CPU. While the next data sample is processed, the magnitude and limited average of the preceding values are calculated. This data is available to the CMTS through an FPGA data port.

Figure 5B:
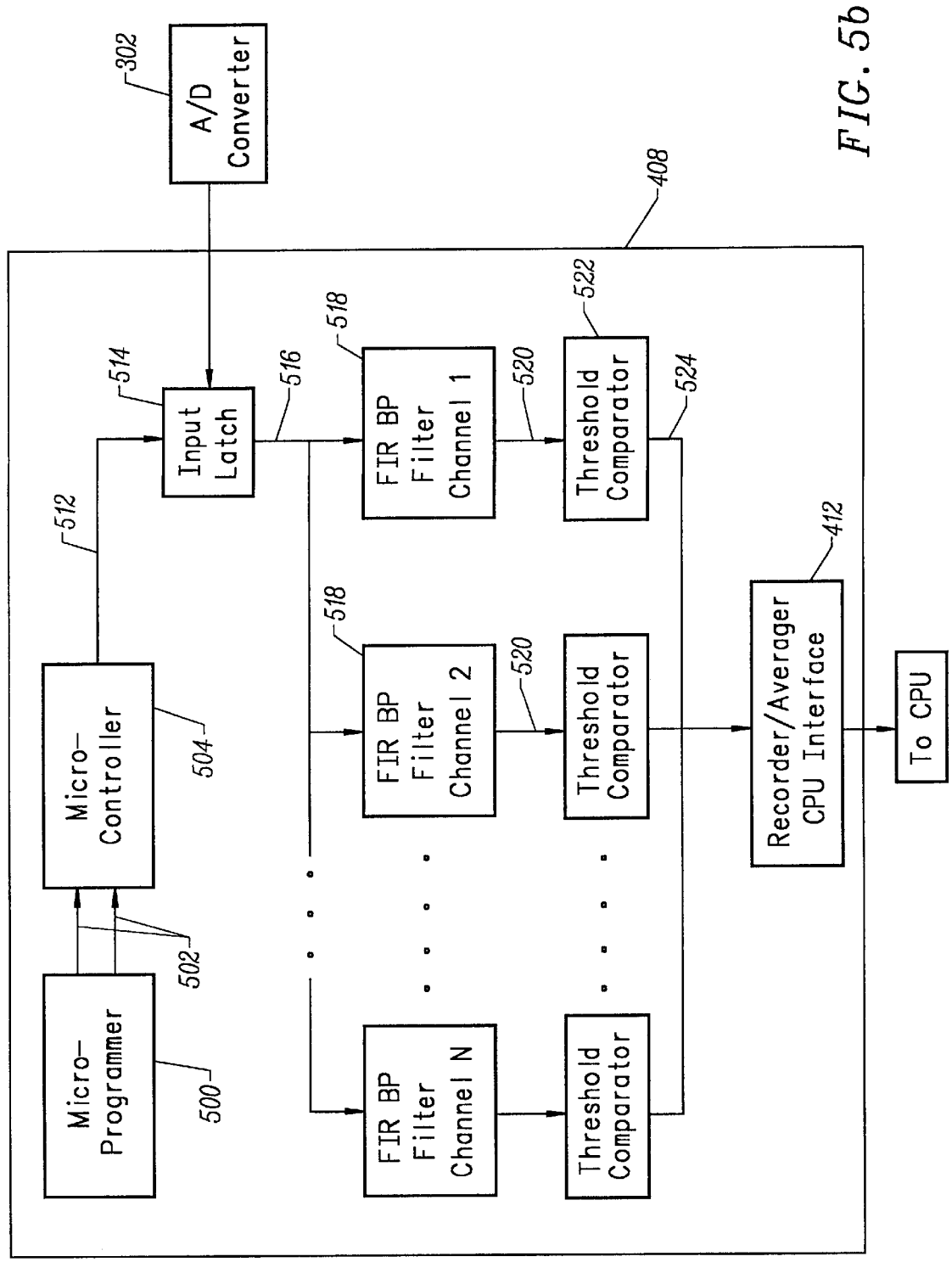
FIG. 5b is a block diagram showing components of an FPGA configured to operate as an N channel receiver in a preferred embodiment.

FIG. 5b is a block diagram showing components of an FPGA configured to operate as an N channel receiver. The CPU re-configures the FPGA to perform as a FIR filter. Microprogrammer 500 is programmed so that the FPGA will perform as a FIR filter. Microprogrammer 500 is connected to microcontroller 504 through lines 502, as described with respect to FIG. 5a. Microcontroller 504 controls the operation of the FIR by sending control data over a serial line 512 to an input latch 514. Input latch 514 receives digitized radio frequency data from analog/digital converter 302 of FIG. 3. Input latch 514 transfers the digitized data corresponding to the N channels selected by the FFT through a data bus 516. All the data necessary for the FIR is stored locally in registers (not shown). Thus, a separate memory bank similar to RAM bank 410 is not needed because the amount of data is substantially less than that needed for a Fast Fourier Transform. Input latch 514 transfers data to a series of Finite Impulse Response band pass filters 518, where the output of each of the filters represents the noise power of the corresponding frequency band. The number of FIR bp filters in this series corresponds to the number of potential channels the FFT is programmed to compute (typically constrained by hardware limitations of the FPGA). Each of the FIR bp filters 518 processes data for each of the potential channels on a continuous basis. A series of threshold comparators 522 is used to perform averaging and comparing functions, and to determine the number of times a channel exceeds a threshold noise level. Each of the threshold comparators in the series receives data from an FIR filter through a data bus 520. The threshold comparators each send data through data bus 524 to a recorder and averager, which essentially acts as CPU interface 412 of FIG. 4 for local data storage from where the CPU can read the data. The values are then averaged over a limited time and made available to the CPU through the CPU interface.

A spectrum manager of the present invention can operate in one of three modes for processing static and dynamic noise. In the first mode the FPGA is programmed to perform a Fast Fourier Transformation (FFT). In this mode, the FFT processor monitors the entire upstream spectrum and breaks up the upstream spectrum to create categories or bins. The FFT digitally partitions the spectrum and provides energy measurements of selected bands. FFTs can be programmed to measure an entire band or it can be programmed to do a single band of, for example, 1 MHz.

In another mode, the FPGA is programmed as an N channel receiver. In this mode a channel must be continuously monitored. The spectrum manager acts as power monitor that records the number of times the power exceeds a preset value in a particular time interval. The FPGA is programmed to behave as a FIR filter which measures the energy in a particular bin as derived by the FFT. It then measures the energy in real-time for each particular bin. The FIR filter measures continuously a single frequency. In this mode the spectrum manager is parked on the frequencies determined to be clean after the FFT analysis. These clean channels are then monitored continuously.

In another mode of a preferred embodiment, the FPGA is programmed as a combination of the FFT processor and N channel receiver resulting in a "plug and play" mode. It is possible to run both FFT and FIR sequentially on the same FPGA. With advances in FPGA technology, it is possible to do both FFT and FIR analysis on the same FPGA without any serious compromises. This also depends on how much mathematical functionality can be contained in the FPGA. In this mode, the FPGA monitors long-term ingress noise as an FFT processor thereby selecting N clean frequencies. The CPU then re-programs the FPGA to be an N channel receiver (FIR filter) for monitoring impulse noise for the selected frequencies. This process is repeated periodically until an acceptable history is obtained, at which point the FFT analysis is decreased. From the FFT data, the processor will continue to update available frequencies for upstream transmission and maintain long-term averages for potentially available clean frequencies.

In all three modes of the FPGA, data are accumulated by sampling the spectrum and then processed off-line by the CPU. The time at which the receivers are cleared of accumulated data are determined by the cable plant tester. The cable plant tester also sets a noise threshold and measures how many noise spikes pass this threshold during a predetermined time period (e.g., one minute). The number of noise spikes that pass the threshold will determine whether the channel has an acceptable noise level. Thus, the determination of whether a channel is acceptable depends on where the threshold is set and the number of times the noise level exceeds the threshold. Data in the spectrum manager is cleared and processed by the CPU. In a selected embodiment, the CPU identifies a frequency as acceptable only if there were no noise spikes.

The CPU also determines when a channel is checked again after it is found to be unacceptably noisy. In programming the CPU to make this determination, it is assumed that the system is chaotic and that what is clean or acceptable now may not be a short time later, such as 10 seconds later or less. Thus, the FFT is performed as often as possible, such as every several of milliseconds. It should be kept in mind that there are potentially hundreds of different sources of noise, such as wide band and narrow band sources. The sources enter the cable plant system at different frequencies and at different times. The same source may interfere with the system multiple times. Thus, there may be multiple instances of the same source interfering with this system at different times.

Placing the spectrum manager in the headend generally reduces the problem of latency. Latency is the time from when a measurement is taken to the time a channel selection based on the measurement is effected. For higher accuracy, this time lag should be kept to a minimum. The latency is significantly minimized to the point where it is practically eliminated by placing the spectrum manager in the headend, i.e., in the CMTS. This is where the upstream ingress noise is accumulated and, in a specific embodiment, where the noise is measured and the information processed. As shown in FIG. 3, the spectrum manager receives the digitized upstream data at the same time as upstream receiver 214. In a specific embodiment, the latency is only a couple of CPU cycles. This is clearly an improvement over previous systems in which the latency is minutes or even days.

The latency problem will be understood with reference to a specific example. A ham radio operator can press the transmit button on his radio thereby powering the radio from zero watts to 2000 watt EIRP in a very short period of time, i.e., the time it takes for a clean channel in the cable system to go from being acceptable to totally unacceptable. This type of interference will saturate the receiver on that channel almost immediately. The goal is therefore to allow cable modems using that particular channel to switch to another channel as quickly as possible.

Figure 6A:
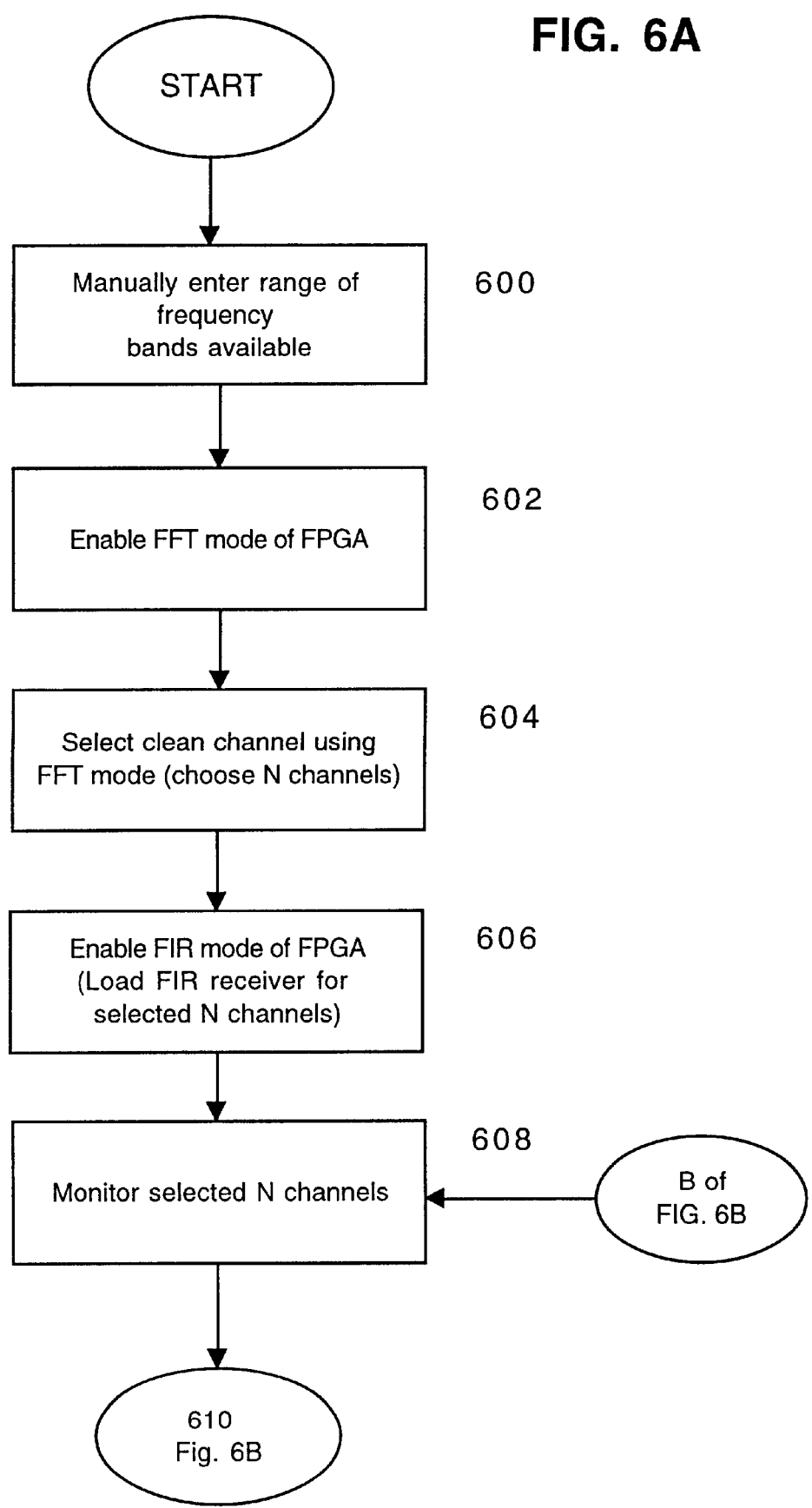
FIGS. 6a and 6b are flowcharts showing a process of programming the FPGA programmed to perform an FFT analysis and to perform as an N channel receiver in a preferred embodiment.

FIG. 6a is a flowchart showing the process of programming the FPGA to perform an FFT analysis and to operate as an N channel receiver. In a step 600, the tester manually enters a range of frequency bands available. For example, for the upstream carrier in the cable system, the range is normally 5 to 6Z MHz. This is the range in which potential upstream carrier channels can fall. In a step 602, the FFT mode of the FPGA is enabled. This allows the spectrum manager to search for long-term static ingress noise on the system. It essentially sweeps all potential frequencies for clean channels as possible candidates for carrying upstream data. In a step 604, the system selects N candidate channels using the FFT result.

In a step 606, the system configures the FPGA as an N channel receiver by enabling the FIR mode. In the FIR mode, the FPGA continuously monitors the selected N channels for impulse noise. The FPGA, now in FIR mode, is loaded for the selected N channels and monitors them (step 608) continuously. The accumulated data on these channels is used later by the CPU to determine if any bands are better than the current upstream band.

Figure 1:
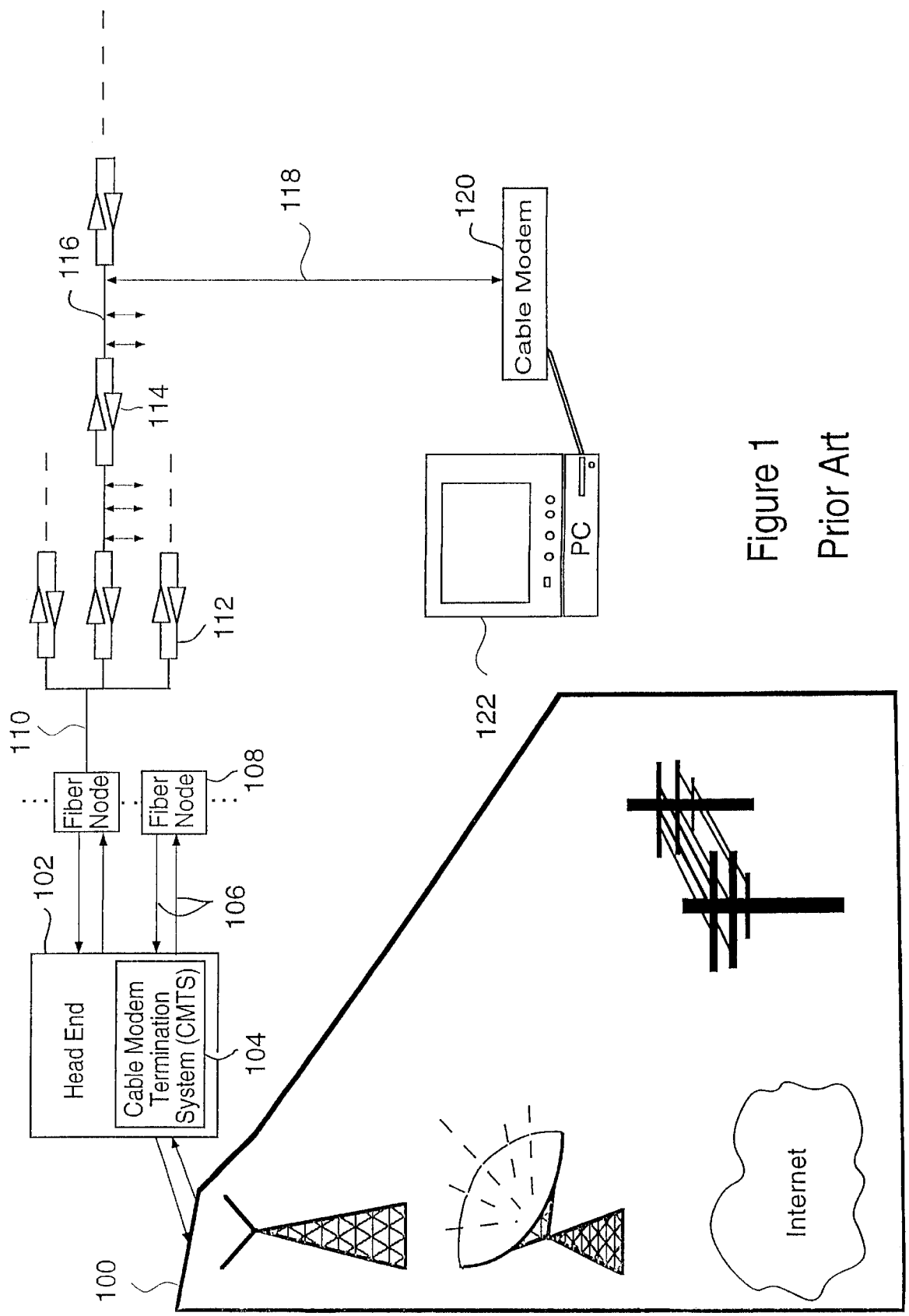
FIG. 1 is a block diagram of a two-way HFC cable system utilizing a cable modem for data transmission.
Figure 2:
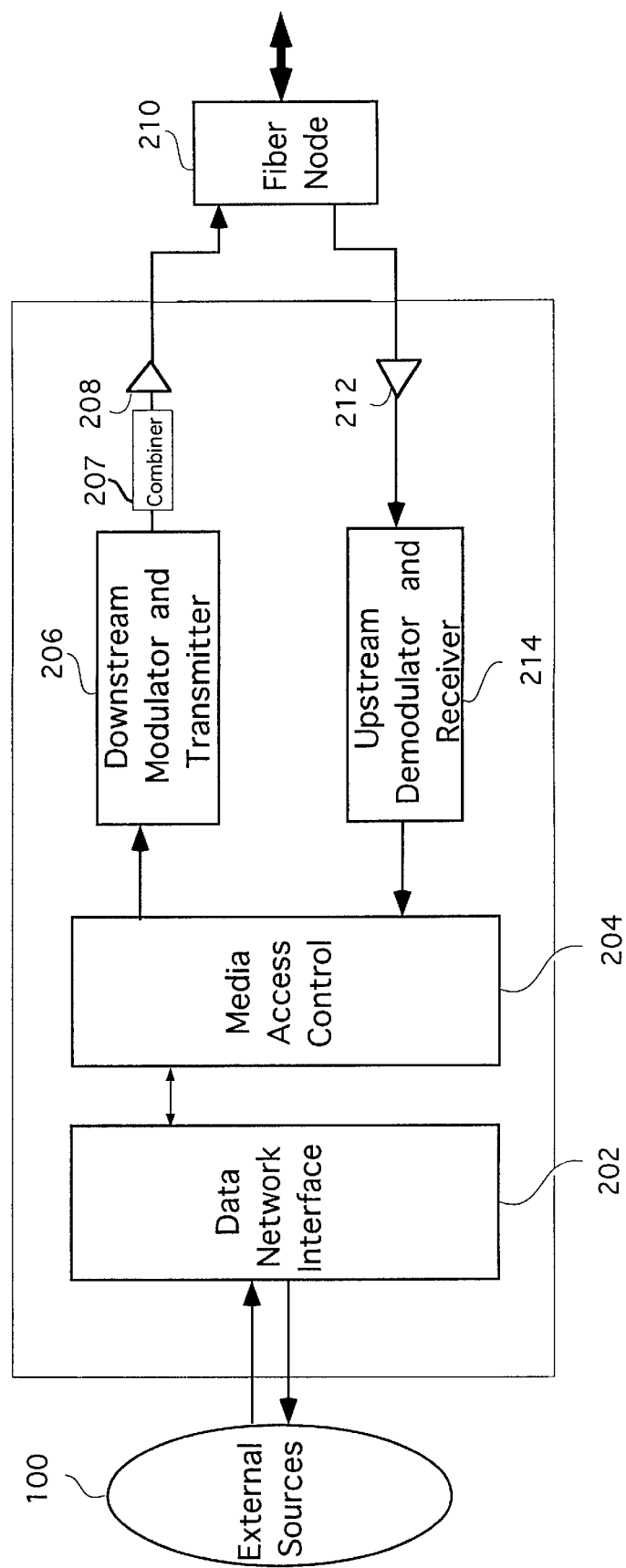
FIG. 2 is a block diagram showing the basic components of a cable modem termination system.
Figure 6B:
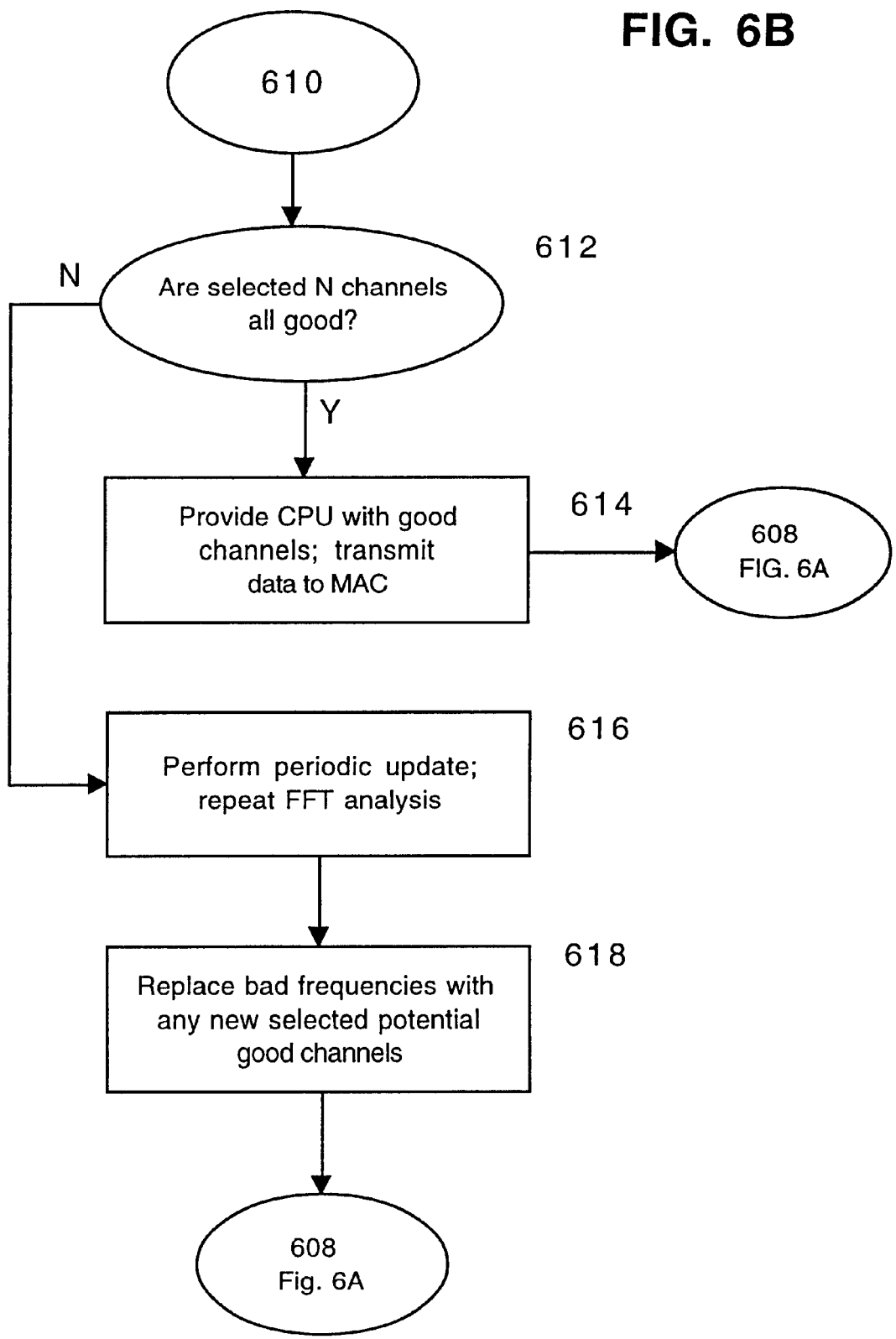

In a step 612 of FIG. 6b, the CPU determines whether the selected N channels are all good. A good frequency is defined by thresholds and other settings in a process run by the CPU. If all channels are determined to be good, the data is provided to the medial access control (MAC) 204 of FIG. 2 located in the CMTS in step 614. Control then returns to step 608 of FIG. 6A where the system continues to monitor the selected N channels. If any of the selected N channels are unacceptable, the system repeats the FFT analysis in a step 616 as described in steps 602 and 604. This periodic update is done to obtain new candidates for the N channel receiver. In a step 618 the system replaces the bad channels with any of the newly selected good channels.

Figure 7:
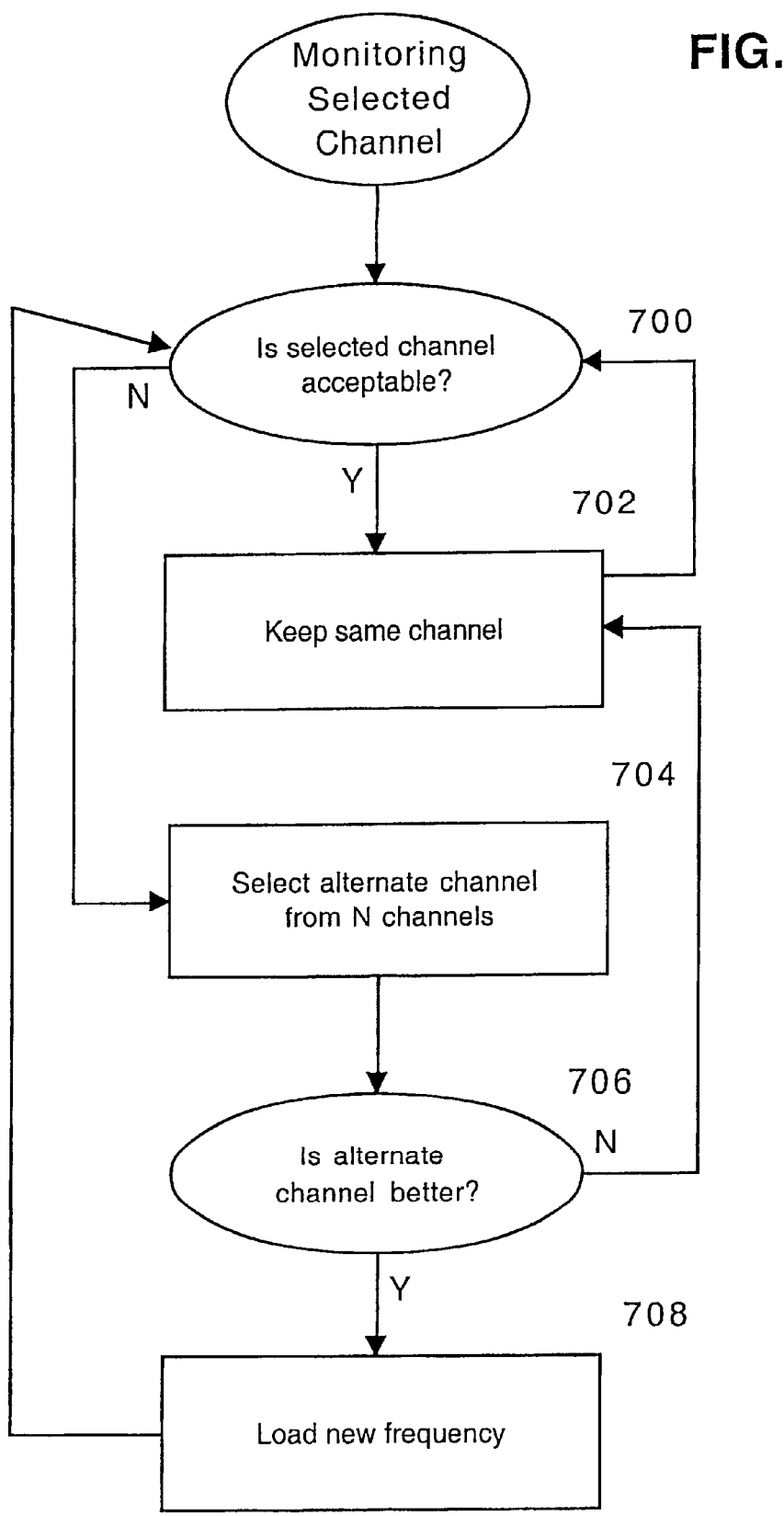
FIG. 7 is a flowchart showing a process for monitoring a channel selected from one of the N channels as determined in FIGS. 6a and 6b.

FIG. 7 is a flowchart showing a process for monitoring a channel selected from one of the N channels as determined in FIGS. 6a and 6b. When an upstream channel is selected, it must be monitored to ensure that it continues to be at an acceptable noise level. If the current channel becomes bad, the system must attempt to select another channel. At a step 700 the system determines whether the selected channel has an acceptable noise level. In a preferred embodiment, the system will always find a better channel because it is continuously monitoring. It takes the carrier to noise ratio from the data receiver, calculates the absolute amplitude of the noise, and compares it to the absolute amplitude of the noise on the monitored channel. The system then checks to see which is smaller, and uses the lowest channel. If the channel is good, the system simply stays on that channel in step 702. It then continues to monitor the selected channel by returning control to step 700. If the selected channel becomes unacceptable, the system selects an alternate channel from the N channels selected in FIGS. 6a and 6b in step 704. It then monitors the alternate channel to see if it is good in step 706. The system compares the noise figure of the current channel to the noise figure of the alternate channel. If the channel is not better, the system will keep the same channel as shown in step 702. If the alternate channel is better, the system loads the new channel in 708 so that upstream data is now carried on the new channel. It then continues to monitor the channel as shown in step 700.

As noted above, the process of monitoring newly selected channels is continuous and does not have a logical completion since new channels are selected whenever the current channel becomes bad. Thus, the process runs continuously as long as the cable plant is being used for two-way transmission of data or as long as an upstream data carrier is needed for data transmission. The process may stay within steps 700 and 702 as long as the currently selected channel is good. The monitoring process terminates when the cable plant no longer has the need for upstream data transmission.

Although the foregoing invention has been described in some detail for purposes of clarity of understanding, it will be apparent that certain changes and modifications may be practiced within the scope of the appended claims. Furthermore, it should be noted that there are alternative ways of implementing both the process and apparatus of the present invention. For example, even though latency problems might increase, the spectrum manager of the present invention can be placed outside the CMTS, or even the headend, and still be able to evaluate and select better upstream channels. In another example, the FPGA can be programmed to perform solely as an FFT processor or as an FIR filter to accomplish the same goal. Accordingly, the present embodiments are to be considered as illustrative and not restrictive, and the invention is not to be limited to the details given herein, but may be modified within the scope and equivalents of the appended claims.

What is claimed is:

1. A programmable device comprising programmable circuitry:
    operable in a first mode to receive a first signal having a frequency spectrum associated therewith, the frequency spectrum including a plurality of channels, and to determine a first noise level for each of the plurality of channels; and
    operable in a second mode to filter the first signal, thereby generating a plurality of filtered signals each filtered signal corresponding to one of the plurality of channels, and to monitor a second noise level associated with each of the filtered signals;
    wherein the channels associated with the filtered signals are selected for monitoring in the second mode based on the first noise levels determined in the first mode.

2. A device as recited in claim 1 wherein the programming circuitry determines the first noise level for each of the plurality of channels at predetermined time intervals when operating in the first mode.

3. A device as recited in claim 1 wherein the programming circuitry filters the first signal and monitors the second noise level associated with each of the filtered signals continuously.

4. A device as recited in claim 1 further comprising control circuitry for instructing the programmable circuitry to operate in one of the first mode and the second mode.

5. A device as recited in claim 4 wherein the control circuitry further comprises a microprogrammer for containing instructions for operating the programmable circuitry and a microcontroller for implementing the instructions for operating the programmable circuitry.

6. A device as recited in claim 1 wherein the programmable circuitry performs a fast Fourier transformation when operating in the first mode.

7. A device as recited in claim 6 further comprising data storage circuitry for use by the programmable device when operating in the first mode.

8. A device as recited in claim 1 wherein the programmable circuitry operates as a finite impulse response filter in the second mode.

9. A device as recited in claim 1 further comprising an input latch for receiving the first signal.

10. A device as recited in claim 1 wherein the channels selected correspond to filtered signals with first noise levels below a predetermined threshold.

11. A device as recited in claim 1 wherein the channels selected correspond to filtered signals with the low first noise levels.

12. A programmable device for receiving a first signal having a frequency spectrum associated therewith, the frequency spectrum comprising a plurality of channels, the programmable device comprising:
    signal processing circuitry which:
        in a first mode comprises frequency transformation circuitry which generates a second signal representative of a noise spectrum associated with the first signal, the noise spectrum comprising a plurality of first noise levels each associated with one of the plurality of channels; and
        in a second mode comprises a plurality of filters each of which corresponds to a selected one of the plurality of channels;
    noise monitoring circuitry for determining a second noise level of each of the selected channels; and
    control circuitry for controlling the signal processing circuitry.

13. A programmable device as recited in claim 12 wherein the programmable device is a field programmable gate array.

14. A programmable device as recited in claim 12 wherein the frequency transformation circuitry of the first mode further comprises data storage circuitry for storing data necessary when performing a frequency transformation.

15. A programmable device as recited in claim 12 wherein the frequency transformation circuitry of the first mode generates the second signal representative of the noise spectrum by monitoring the first signal at predetermined time intervals.

16. A programmable device as recited in claim 12 wherein the plurality of filters of the second mode filter the first signal continuously.

17. A programmable device as recited in claim 12 wherein the filters of the signal processing circuitry operating in the second mode are finite impulse response filters.

18. A programmable device as recited in claim 12 wherein the noise monitoring circuitry comprises a plurality of threshold comparators, such that each threshold comparator is coupled to a filter for determining the second noise level of the selected channel corresponding to the filter.

19. A programmable device as recited in claim 12 wherein the control circuitry comprises a microprogrammer for storing instructions on operating the signal processing circuitry and a microcontroller for implementing the instructions contained in the microprogrammer.

20. A programmable device as recited in claim 12 further comprising an input latch for receiving and storing the first signal.

21. In a cable television system, a method of locating a low-noise channel for data transmission from a subscriber to a headend including:
   receiving a first signal having a frequency spectrum associated therewith, the frequency spectrum comprising a plurality of channels;
   generating a second signal representative of a noise spectrum associated with the first signal, the noise spectrum comprising a plurality of first noise levels each corresponding to one of the plurality of channels;
   selecting a first subset of the plurality of channels as selected channels based on the first noise levels;
   band pass filtering the first signal in the selected channels thereby generating a plurality of filtered signals;
   monitoring a plurality of second noise levels, each second noise level corresponding to one of the filtered signals; and
   selecting for data transmission one of the selected channels based on a second noise level.

22. A method as recited in claim 21 wherein the frequency spectrum is in the range of 5 MHz to 42 MHz.

23. A method as recited in claim 21 wherein generating the second signal comprises performing a frequency transformation on the first signal.

24. A method as recited in claim 21 further comprising evaluating the plurality of first noise levels comparing each noise level to a current noise level of a current channel.

25. A method as recited in claim 21 wherein the band pass filtering comprises filtering the first signal with a finite impulse response filter.

26. A method as recited in claim 21 wherein monitoring a plurality of second noise levels comprises comparing each second noise level to a predetermined threshold and accumulating data on each second noise level.

27. A cable television system capable of two-way transmission of data comprising:
   a downstream data path to subscribers on the cable television system originating from a headend;
   a downstream modulator and transmitter for modulating and transmitting a downstream signal to be carried on the downstream data path to subscribers on the cable television system;
   an upstream data path to the headend originating from subscribers on the cable television system;
   an upstream demodulator and receiver in the headend for receiving and demodulating a first signal to be carried on the upstream data path;
   a spectrum manager for receiving and monitoring the first signal carried on the upstream data path comprising:
      signal processing circuitry for generating a second signal representative of a noise spectrum associated with the first signal, the noise spectrum comprising a plurality of first noise levels, each associated with one of a plurality of channels, and for determining a second noise level for selected channels of the plurality of channels, the selected channels being selected based on the plurality of first noise levels; and
      control circuitry for controlling operation of the signal processing circuitry.

28. A cable television system as recited in claim 27 wherein the upstream and downstream paths comprise a hybrid fiber coaxial cable television system.

29. A cable television system as recited in claim 27 wherein the headend contains a cable modem termination system.

30. A cable television system as verified in claim 29, wherein the spectrum manager is coupled to the upstream data path within the cable modem termination system.

31. A cable television system as recited in claim 27 further comprising a cable modem for receiving data on the downstream data path and transmitting data on the upstream data path.

32. A cable television system as recited in claim 27 wherein the spectrum manager is coupled to the upstream data path within the headend.

33. A cable television system as recited in claim 27 wherein the spectrum manager is coupled to the upstream data path outside the headend.

34. A cable television system as recited in claim 33 wherein the spectrum manager is coupled to the upstream data path at a subscriber location.

35. A cable television system as recited in claim 27 wherein the spectrum manager further comprises a low-pass filter for eliminating portions of the first upstream signal above a predetermined frequency.

36. A cable television system as recited in claim 27 wherein the spectrum manager further comprises an external processor interface for communicating data from the signal processing circuitry to an external processor.

37. A cable television system headend comprising:
   a downstream transmitter for transmitting to subscriber destinations a downstream signal having a downstream frequency spectrum associated therewith;
   an upstream receiver for receiving a first signal having an upstream frequency spectrum associated therewith, the upstream frequency spectrum made up of a plurality of channels;
   a spectrum manager for receiving and monitoring the first signal comprising:
      signal processing circuitry for generating a second signal representative of a noise spectrum associated with the first signal, the noise spectrum comprising a plurality of first noise levels each associated with one of a plurality of channels, and for determining a second noise level for selected channels of the plurality of channels, the selected channels being selected based on the first noise levels; and
      control circuitry for controlling the signal processing circuitry.

38. A system headend as recited in claim 37 further comprising a cable modem termination system containing the downstream transmitter, the upstream transmitter, and the spectrum manager.

39. A system headend as recited in claim 37 further comprising a media access control unit for storing data regarding cable modems in the cable television system.

40. A system headend as recited in claim 37 further comprising a data network interface for receiving data from sources external to the cable television system.

41. A system headend as recited in claim 37 further comprising a converter for converting the first signal from an analog signal to a digital signal before the first signal is received by the spectrum manager.

42. A system headend as recited in claim 37 wherein data corresponding to the second noise levels for the selected channels is retrievable by an external processor with minimal latency between the time the first signal is received by the upstream receiver and the second noise levels for the selected channels are determined by the signal processing circuitry.

43. At least one computer readable medium including programmed instructions arranged to locate a low-noise channel for data transmission from a subscriber to a headend, comprising:

computer programming instructions for receiving a first signal having a frequency spectrum associated therewith, the frequency spectrum comprising of a plurality of channels;

computer programming instructions for generating a second signal representative of a noise spectrum associated with the first signal, the noise spectrum comprising a plurality of first noise levels each corresponding to one of the plurality of channels;

computer programming instructions for selecting a first subset of the plurality of channels as selected channels based on the first noise levels;

computer programming instructions for band pass filtering the first signal in the selected channels thereby generating a plurality of filtered signals;

computer programming instructions for monitoring a plurality of second noise levels, each second noise level corresponding to one of the filtered signals; and computer programming instructions for selecting for data transmission one of the selected channels based on the second noise levels.

44. A computer readable medium as recited in claim 43 wherein the computer programmed instructions for generating the second signal comprises programmed instructions for performing a frequency transformation on the first signal.

45. A computer readable medium as recited in claim 43 further including programmed instructions for evaluating the plurality of first noise levels whereby each first noise level is compared to a current noise level of a current channel.

46. A computer readable medium as recited in claim 43 wherein the computer programmed instructions for monitoring comprises programmed instructions for comparing the second noise level to a predetermined threshold and accumulating data on the second noise level.

* * * * *